United States Patent [19]

Okamura

[11] Patent Number: 5,056,904
[45] Date of Patent: Oct. 15, 1991

[54] VIEWER

[76] Inventor: Makoto Okamura, 1567-4, Sakata,, Okegawa-shi, Saitama-ken, Japan

[21] Appl. No.: 475,183

[22] Filed: Feb. 5, 1990

[30] Foreign Application Priority Data

Feb. 6, 1989 [JP] Japan .................................. 1-27112

[51] Int. Cl.[5] ........................... G02B 5/08; B60R 1/06
[52] U.S. Cl. .................................... 359/841; 350/857; 350/872; 350/742
[58] Field of Search ................ 350/604, 605, 606, 631, 350/632, 602, 618, 622, 626, 452; 248/476, 477, 478, 489, 490, 491

[56] References Cited

U.S. PATENT DOCUMENTS

| | | | |
|---|---|---|---|
| 1,365,247 | 1/1921 | Kennedy | 350/622 |
| 1,576,793 | 3/1926 | Sadler | 350/604 |
| 2,758,508 | 8/1956 | Petri et al. | 350/604 |
| 3,788,735 | 1/1974 | Rowley | 350/622 |
| 3,972,596 | 8/1976 | Baumgardner et al. | 350/452 |
| 4,108,551 | 8/1978 | Weber | 350/622 |
| 4,274,714 | 6/1981 | Okamura | 350/602 |
| 4,469,405 | 9/1984 | Chin-Wum | 350/604 |
| 4,497,541 | 2/1985 | Okamura | 350/626 |
| 4,685,779 | 8/1987 | Gonzalex | 350/604 |
| 4,688,905 | 8/1987 | Okamura | 350/541 |
| 4,900,140 | 2/1990 | Okamura | 350/452 |

FOREIGN PATENT DOCUMENTS

| | | | |
|---|---|---|---|
| 0009050 | 6/1916 | United Kingdom | 350/618 |
| 2085382 | 4/1982 | United Kingdom | 350/604 |

Primary Examiner—Bruce Y. Arnold
Assistant Examiner—R. D. Shafer
Attorney, Agent, or Firm—Steinberg & Raskin

[57] ABSTRACT

A viewer for vehicle which allows a vehicle's driver to clearly see the backward observation zone so as to move a medium or large truck backward safely, and comprises a container box mounted to the vehicle body and a viewing unit which comprises an optical element for view field expansion and a reflector mirror, wherein the viewer can be deployed out of an retracted into the container box and stored in the container box during vehicle's driving, or when not in use.

3 Claims, 4 Drawing Sheets

VIEWER

BACKGROUND OF THE INVENTION

1. Field of the Invention

This invention relates to a viewer for eliminating dead zones around a medium or large size truck or a construction vehicle to ensure safety in driving.

2. Description of the Prior Art

The prior art uses a convex mirror method, a TV method, or a sensor method using radio waves. The convex mirror method has disadvantages that images are extremely distorted, the effective observation zone is narrow, and a large convex mirror installed at the back of a vehicle for backward observation protrudes from the vehicle body and is not suited to safe operation.

The TV method has problems in that it is expensive, the camera may be stolen, and a room for an image receiver is required.

The sensor method using radio waves also has problems that result from indirect sensing of obstacles, such as faults in the equipment, the procedure for sensitivity adjustment, and erroneous reaction due to too sharp sensitivity.

To solve these problems, techniques indicated in Japanese Utility Model Laid-Open 55-15118 and 59-133340, and Japanese Patent Laid-Open 60-213534 were proposed. However, the techniques result in incur problems such as the viewer protruding from the vehicle body, causing danger during running, and the possibility of the viewer being damaged or soiled.

SUMMARY OF THE INVENTION

The present invention is a viewer for vehicles which comprises, a viewing unit which comprises a casing with two openings located at a predetermined angle, an optical element for view field expansion mounted to one opening, and a reflector mirror installed within the casing for reflecting a light beam incoming from one opening and directing the reflected beam through another opening, a container box which houses the viewing unit so that the unit can be deployed out of and retracted into the container box, and means for deploying and retracting the viewing unit out of and into the container box. Thus the viewer including the container box can be easily installed at a suitable location on a vehicle, and when necessary the viewing unit can be deployed out of the container box by remote control for observation.

The viewer of the foregoing structure is unitized by housing the viewing unit in the container box, thereby enabling the viewer to be readily installed at an arbitrary location on a vehicle. The viewing unit can be quickly deployed from the container box when necessary by remote control from the driver's seat to position the viewing unit to a good vantage point and can be retracted into the container box after use, thus providing a safe, functional, and economical viewer.

Further, a door is installed in front of an optical element, so that the viewing unit is more positively protected against dirty water or dust and clear images are always acquired.

Therefore, the object of the present invention is to provide a viewer which during driving does not protrude from the vehicle body and is safe and damage-free, and which can obtain clear images once deployed.

BRIEF DESCRIPTION OF THE DRAWINGS

The accompanying drawings show embodiments of the present invention, wherein FIG. 6 is a detailed drawing of the part B shown in FIG. 5, and FIGS. 7 through 10 show another embodiment, wherein

Figure 1A:
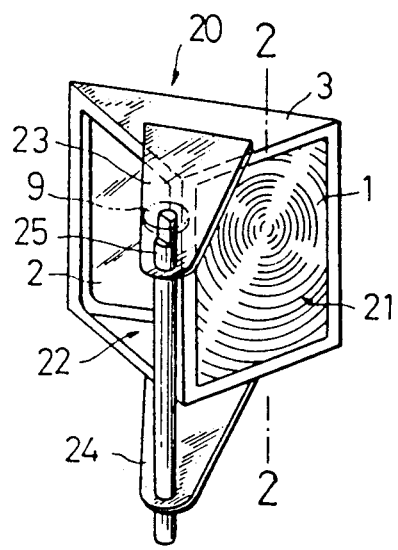
FIG. 1A is a perspective view of a viewing unit.

Reference numeral 1 designates a Fresnel concave lens, 2 a flat mirror, 3 a case, 4 a plate prism, 5 a container box, 6 a flat side-view mirror, 7 a toothed pulley, 8 toothed belt, 9 a toothed follower pulley, 10 a rotary door, 11 a tension spring, 12 a lever, 37 a pin 14 a rotary solenoid with a return spring, and D an observation zone.

DETAILED DESCRIPTION OF THE PREFERRED EMBODIMENT

An embodiment of the present invention will be described with reference to the accompanying drawings.

FIG. 1A shows a viewing unit 20 comprising a triangular prism casing 3 with openings on the two sides which form openings 21 and 22 located at an angle with each other. The opening 21 comprises a Fresnel concave lens 1 as an optical element for view field expansion. In the casing 3, a reflector mirror 2 is installed so as to allow a light beam from the opening 21 with the Fresnel concave lens 1 to be reflected from the mirror 2 and to be directed through the opening 22. Numerals 23 and 24 designate brackets. Numeral 25 designates a pin that functions as a rotary drive shaft, which is fixed to the bracket 23.

Figure 1B:
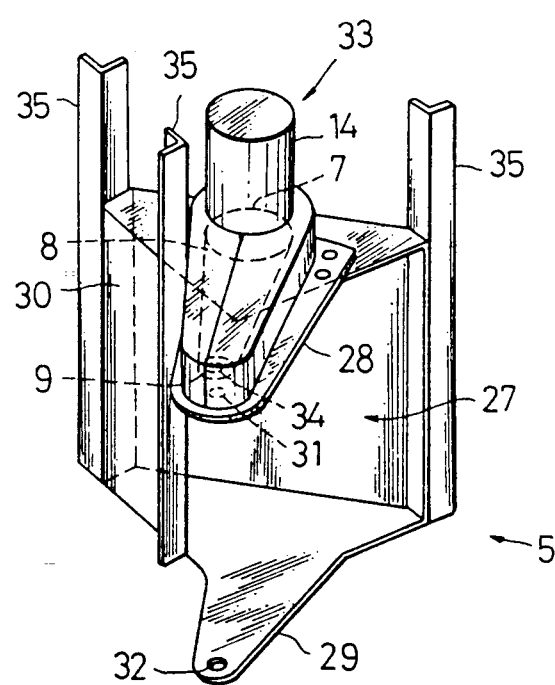
FIG. 1B is a perspective view of a container box.

FIG. 1B shows a container box 5 for housing the viewing unit 20. The casing 30 is a triangular prism, and one side is an opening 27. The upper and lower plates of the casing have extensions comprising shaft supports 28 and 29 with bearing holes 31 and 32. The pin 25 of the viewing unit 20 is rotatively supported by the bearing holes 31 and 32 so that the pin can rotate, and the viewing unit 20 rotates round the vertical axis and is held so that it can be deployed out of and retracted into the container box.

Numeral 33 designates a means for deploying and retracting the viewing unit 20 from and into the container box 5, and which comprises a rotary solenoid 14 with a return spring, a toothed pulley 7 on the drive side, a toothed belt 8, and a toothed pulley 9 on the follower side. The pin 25 of the viewing unit 20 is inserted into a center hole 34 of the toothed pulley 9 on the follower side so as to transfer the torque, and the viewing unit 20 is swung by the rotary solenoid 14 so as to move in or out of the container box 5. The rotary solenoid 14 is turned on or off in synchronization with the operation of the vehicle's reverse gear. When the gear is set to the reverse position, the rotary solenoid is turned on and the viewing unit 20 moves out of the container box, and when the gear is shifted from the reverse position, the rotary solenoid is turned off and the viewing unit 20 retracts in the container box by the return spring.

Numeral 35 designates a fitting for mounting the viewer to the vehicle body.

Figure 2:
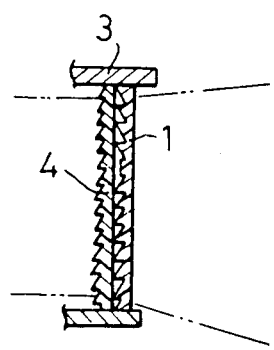
FIG. 2 is a partial sectional view along the line 2—2 of the perspective view shown in FIG. 1A.

FIG. 2 shows an example of an optical element for view field expansion comprising a Fresnel lens 1 and Fresnel prism 4 which are overlapped, and can be used for downward view field expansion.

Figure 3:
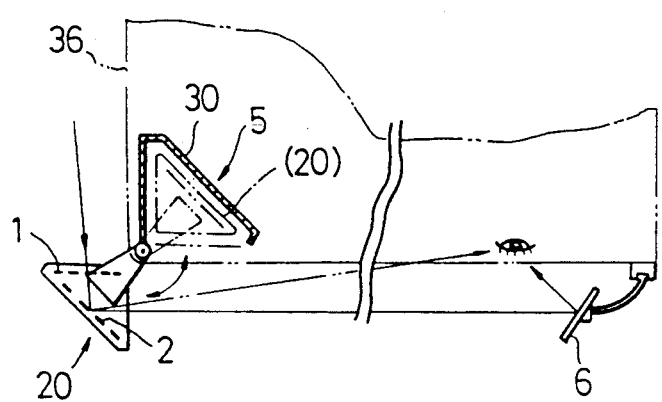
FIG. 3 is an illustration of an optical viewing path of the present invention.
Figure 4:
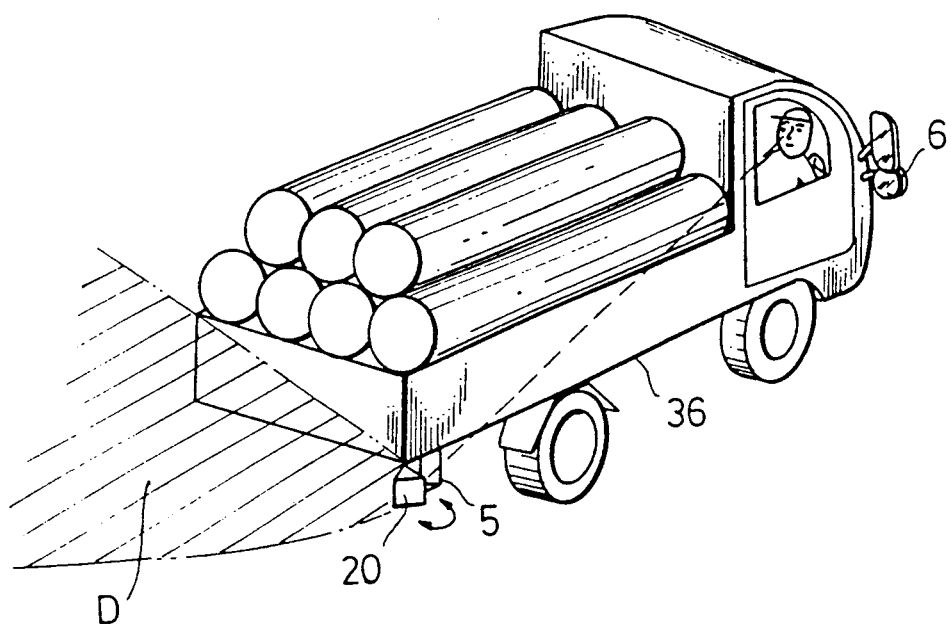
FIG. 4 is a perspective view of the viewer installed on a truck.

FIGS. 3 and 4 show a viewer installed on the rear right of a vehicle body 36 with the viewing unit 20 deployed out of the container box and positioned in place.

Figure 5:
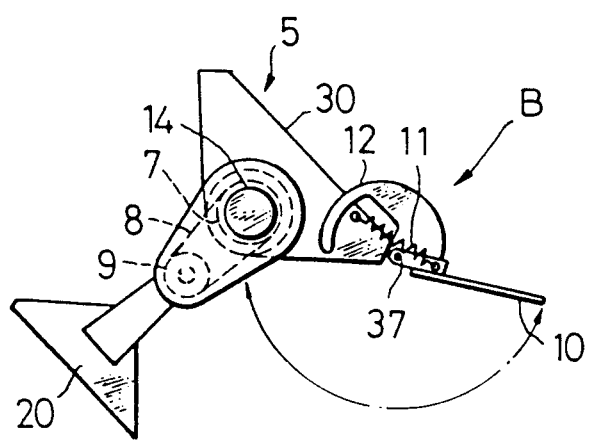
FIG. 5 is a schematic view of the container box with a rotary door.
Figure 6:
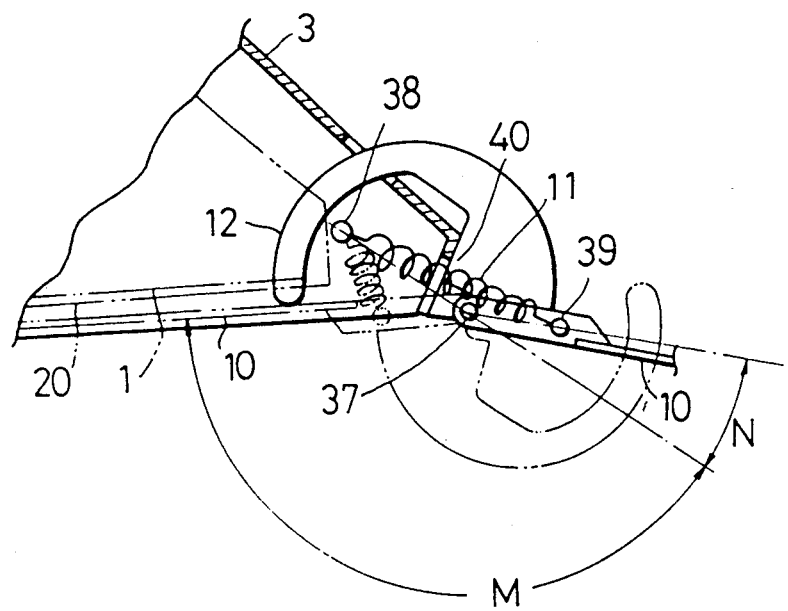
Figure 7:
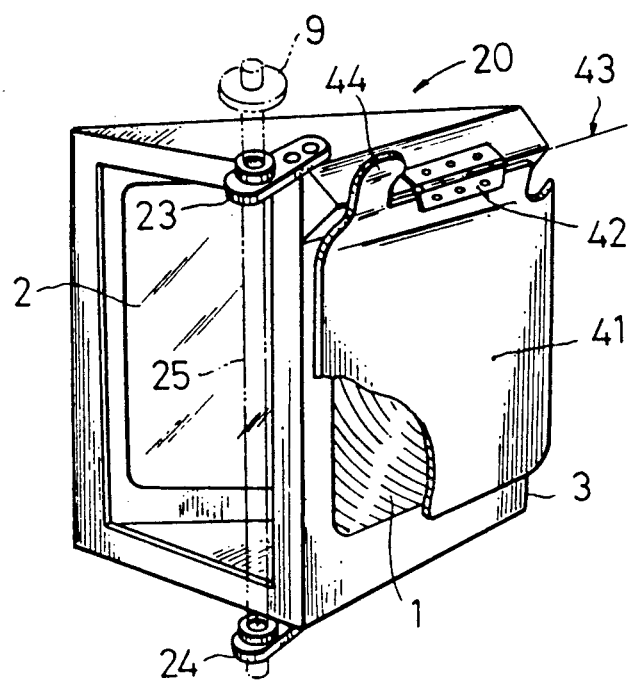
FIG. 7 is a perspective view of a viewing unit.
Figure 8:
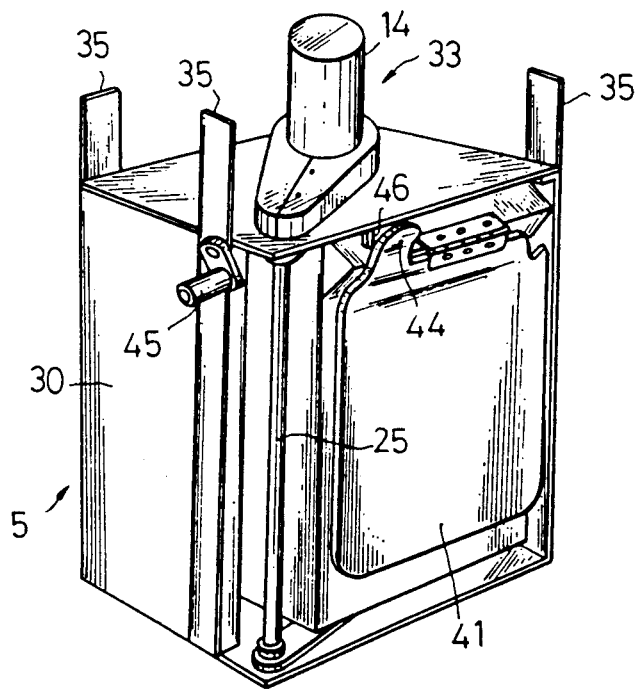
FIG. 8 is a perspective view of a container box containing the viewing unit.
Figure 10:
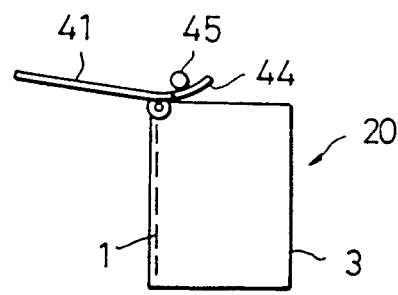
FIG. 10 is a side view of the viewing unit shown in FIG. 9.

FIGS. 5 and 6 show the structure of a door 10 which is open at its maximum. The door 10 is swingingly supported on a pin 37 installed on the casing 30 of the container box 5.

Once the door 10 is closed, the door covers the Fresnel concave lens 1 of the viewing unit 20 which retracts in the container box as shown in FIG. 6 for protection. A tension spring 11 spans between a pin 38 (on the casing 3) and a pin 39 (mounted to the door 10), thereby forming a toggle mechanism that when the open angle of the door is less than a predetermined angle of M, forces the door to close, and when the open angle is more than M, forces the door to open.

Numeral 40 designates a stopper which is in contact with the casing 3 so as to limit the maximum open angle of the door 10. Numeral 12 designates a lever. When the viewing unit 20 is retracted into the container box, the viewing unit presses the lever 12 so as to return the door 10 to a location at an angle less than M, thereby the door 10 is closed by the toggle mechanism.

When the vehicle's gear is set to the reverse position and the rotary solenoid 14 is turned on, the viewing unit 20 moves out of the container box to jerk open the door 10. The door 10 exceeds the predetermined angle M by inertia, and is held in the open state by the toggle mechanism. To keep the open state positively, it is desirable to force the door 10 to open at an angle more than M with a cam, lever, or link mechanism which is commonly known. The angle M is preferably large.

An embodiment of a viewer used for backward observation of a cargo truck will be described hereunder with reference to FIGS. 1 through 6 for description of the operation of the viewer. When moving a cargo truck backward, the shift lever is set to the reverse position and the backup lamp is turned on. Using the power circuit of the backup lamp, the viewing unit 20 is deployed out of the container box 5 by the deploying-/retracting means 33 to a predetermined position. In this case, the rotary solenoid with a return spring 14 is used as driving power of the deploying/retracting means 33. This power rotates the viewing unit 20 via the toothed pulley 7 on the drive side, the toothed belt 8, and the toothed pulley 9 on the follower side, thereby deploys the viewing unit 20 out of the container box 5 to a predetermined position.

The driver of the truck can monitor the backward observation zone D imaged on the flat mirror 2 of the viewing unit 20 directly through the Fresnel concave lens 1 which is an optical element for view field expansion, or via a combination of the Fresnel concave lens 1 and the plate prism 4, through the window of the driver's seat. Optionally, the driver may readily observe the backward zone by looking into a flat side-view mirror 6 which is aligned in optical axis with the flat mirror 2, without directly looking back at the flat mirror 2. The reason of using the flat side-view mirror 6 is that an ordinary convex mirror forms small images which are hard to observe. Once the backward movement is complete and the gear shift lever is shifted from the reverse position, the backup lamp goes off, power is turned off, the rotary solenoid with a return spring is forced in the direction of the spring force, thereby the viewing unit 20 automatically retracts into the container box 5.

As mentioned above, when moving a vehicle backward, the driver can promptly deploy the viewing unit 20 to a required position, positively observe the dead zone, thereby moving backward with confidence and in safety. Once the backward movement is complete, the viewing unit 20 is automatically retracted into the container box 5, thus the viewer is no more constitutes a nuisance to driving, and the viewing unit 20 is protected from wind, rain, and dust.

As a deploying/retracting means of the viewing unit 20, a motor, a combination of a motor and a gear mechanism, or pneumatic equipment may replace the rotary solenoid 14 having a return spring.

Using the foregoing mechanism, the viewing unit 20 may be deployed to a required position slightly away from the container box 5 by turning the viewing unit 20 on a horizontal axis and shifting it vertically and/or horizontally as well as rotating it on the vertical axis, by a commonly known means. This operation is required when a location on a truck where the container box 5 is to be installed is occupied by another unit.

In the above embodiment, the viewing unit 20 is deployed out of the container box 5 by rotating it clockwise as viewed from the top. However, the viewing unit 20 may be rotated counterclockwise or vertically, or may be shifted linearly, or may be operated by a combination of the above motions depending on the position of the viewer.

In the above embodiment, the size of the Fresnel concave lens 1 is 260×160×2 mm, the focal length is −265 mm, and the focus position is 50 mm above the center. The plate prism 4 is equal in size to the Fresnel concave lens 1, and whose effective side-to-side angle is 15°. The prism and lens are made of acrylic resin.

FIGS. 7 through 10 show another embodiment of the invention. A door 41 is swingingly mounted to the casing 3 of the viewing unit 20 via a hinge 42 provided on the upper edge of the door so that the door rotates on a horizontal axis 43. A tab 44 which protrudes above the horizontal axis 43 is formed on the upper edge of the door 41.

Figure 9:
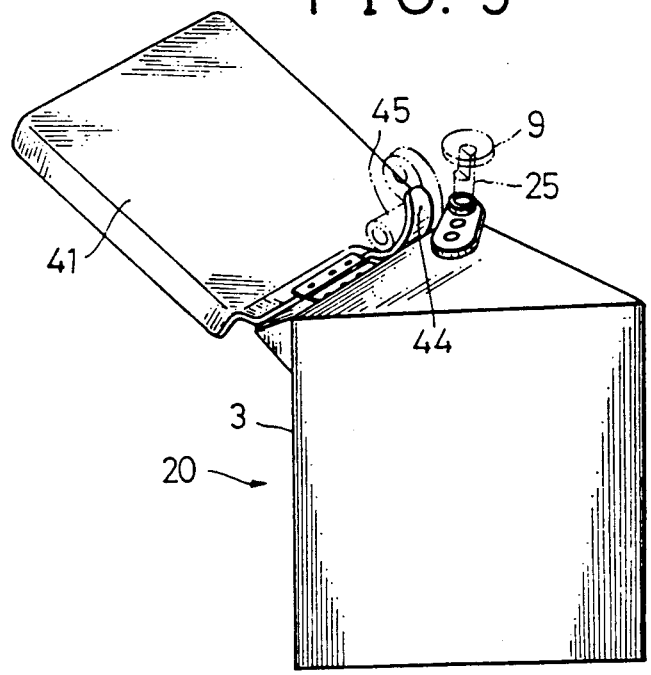
FIG. 9 is a perspective view of the viewing unit deployed in place.

A striker 45 is mounted to the casing 3 of the container box 5. The striker 45 comes in contact with the tab 44 near the farthest predetermined position of the viewing unit 20 when the unit rotates, and presses open the door 41 upward as shown in FIG. 9.

Since the tab 44 is slightly curved, the door 41 is slightly elevated, and does not disturb the upward view field.

Numeral 46 designates a stopper made of a resilient material such as rubber which is mounted to the container box 5 so that immediately before the viewing unit 20 reaches the deepest position of the container box 5, the stopper comes in contact with the tab 44. When the viewing unit 20 is further forced inward by the force of the return spring of the rotary solenoid 14, the door 41 is pressed against the face of the Fresnel concave lens 1, on the contact used as a fulcrum, thereby the clearance is eliminated so as to prevent rain and dust from having access to the viewer.

In this embodiment, the door 41 can be opened at least up to the horizontal level, so that the optical element is out of the direct sunlight and rain, so that clear images are always acquired.

What is claimed is:

1. A viewer for vehicles, comprising:
   a viewing unit which comprises a casing with two openings located at a predetermined angle, an optical element for view field expansion mounted to one opening, and a reflector mirror installed within the casing for reflecting an image incoming from said one opening and directing the reflected image through another opening;
   a container box which houses the viewing unit so that the unit can be deployed out of and retracted into the container box;
   means for deploying and retracting the viewing unit through an angle of substantially 180 degrees out of and into the container box;
   a door mounted on said container box to swingingly open and close about a substantially vertical axis; and
   toggle means including a spring coupled to said door for forcing the door closed when the door is open at an angle less than a predetermined angle and for forcing the door open when the door is open at an angle greater than said predetermined angle.

2. A viewer according to claim 1, wherein a lever is provided on the door and, when the viewing unit is retracted into the container box, the viewing unit presses the lever to apply a closing force to the door.

3. A viewer for vehicles, comprising:
   a viewing unit which comprises a casing with two openings located at a predetermined angle, an optical element for view field expansion mounted to one opening, and a reflector mirror installed within the casing for reflecting an image incoming from said one opening and directing the reflected image through another opening;
   a container box which house the viewing unit so that the unit can be deployed out of and retracted into the container box;
   means for deploying and retracting the viewing unit through an angle of substantially 180 degrees out of and into the container box;
   a door mounted on said viewing unit in front of the optical element to swingingly open and close on a substantially horizontal axis situated at an upper portion of the door;
   a tab formed on said upper portion of the door extending above said horizontal axis; and
   a striker provided on said container box adapted to come into contact with said tab when the viewing unit moves to a predetermined position to open the door to at least a substantially horizontal position.

* * * * *